(12) United States Patent
Bailly et al.

(10) Patent No.: US 11,506,070 B2
(45) Date of Patent: Nov. 22, 2022

(54) METHOD OF MANUFACTURING A BLADED STATOR ELEMENT FOR A TURBOMACHINE AND TOOL FOR CARRYING IT OUT

(71) Applicant: SAFRAN AIRCRAFT ENGINES, Paris (FR)

(72) Inventors: Martial Vincent Bailly, Breuillet (FR); Dominique Michel Rotton, Boutigny sur Essonne (FR); Clémence Joséphine Mauricette Hastoy, Yerres (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 267 days.

(21) Appl. No.: 16/845,541

(22) Filed: Apr. 10, 2020

(65) Prior Publication Data

US 2020/0325786 A1   Oct. 15, 2020

(30) Foreign Application Priority Data

Apr. 12, 2019   (FR) ...................................... 1903940

(51) Int. Cl.
*F01D 9/04* (2006.01)
*F01D 25/24* (2006.01)
*B23P 15/00* (2006.01)

(52) U.S. Cl.
CPC ............ *F01D 9/044* (2013.01); *B23P 15/006* (2013.01); *F01D 25/246* (2013.01); *F05D 2230/233* (2013.01); *F05D 2230/234* (2013.01); *F05D 2230/644* (2013.01)

(58) Field of Classification Search
CPC ........ F01D 9/041; F01D 9/044; F01D 25/246; F01D 25/285; B23K 15/0046; B23K 26/21; B25B 27/16; F05D 2230/644; F05D 2230/232; F05D 2230/233; F05D 2230/234; B23P 15/006
See application file for complete search history.

(56) References Cited

U.S. PATENT DOCUMENTS

| | | |
|---|---|---|
| 1,550,651 A | 8/1925 | Charter |
| 3,414,958 A | 12/1968 | Anderson |
| 9,605,563 B2 | 3/2017 | Chardonnet et al. |

FOREIGN PATENT DOCUMENTS

| | | |
|---|---|---|
| EP | 3132887 A1 | 2/2017 |
| EP | 3381604 A1 | 10/2018 |
| FR | 2989414 A1 | 10/2013 |
| GB | 2132512 A | 7/1984 |

OTHER PUBLICATIONS

Rapport De Recherche Preliminaire and Opinion dated Dec. 5, 2019, for French Application No. 1903940, filed Apr. 12, 2019, 7 pages.

*Primary Examiner* — Moshe Wilensky
(74) *Attorney, Agent, or Firm* — Christensen O'Connor Johnson Kindness PLLC

(57) ABSTRACT

Methods of manufacturing a bladed stator element for a turbomachine include mounting a tool on a circumferential zone of an annular shell prior to welding vanes in the circumferential zone, welding radially outer ends of the vanes to the annular shell, dismantling the tool after welding the vanes in the circumferential zone, and repeatedly mounting and dismounting the tool on different circumferential zones of the annular shell so as to fix the vanes all around the annular shell.

8 Claims, 4 Drawing Sheets

METHOD OF MANUFACTURING A BLADED STATOR ELEMENT FOR A TURBOMACHINE AND TOOL FOR CARRYING IT OUT

CROSS REFERENCE TO RELATED APPLICATION

This application claims priority under 35 U.S.C. § 119 to French Patent Application No. 1903940, filed Apr. 12, 2019, which is herein incorporated by reference in its entirety.

FIELD

Embodiments of the present disclosure relate to the manufacture of a bladed stator element for a turbomachine, e.g., for an aircraft, as well as a tool for carrying out this method.

BACKGROUND

The prior art includes documents FR-A1-2989414, EP-A1-3132887, EP-A1-3381604, GB-A-213512, US-A1-3414958 and US-A1-1550651.

A turbomachine bladed element is usually a general annular shape around an axis which is the longitudinal axis of the turbomachine. Such a turbomachine classically comprises:
an annular shell extending around the axis and comprising
an annular fixing flange extending radially outwardly at each of its axial ends, and
an annular row of vanes extending around the axis inside the shell and whose radially outer ends are fixed to the shell.

A bladed element of this type can be manufactured by machining, casting, assembly of parts, etc. The present disclosure concerns the manufacture of a bladed element comprising the welding of the radially outer ends of the vanes to the shell.

It has been observed that this welding generates retractions linked to the internal stresses of the part, which cause deformations of the structure, and in particular the flanges. These deformations must then be taken up by the post-weld machining operations and in particular by turning, surfacing and drilling of the flanges.

However, when a vane fixed on the shell is not in conformity, it must be replaced by a new one by machining the shell to remove the non-compliant vane and welding the new vane thereto. In this case, the flange has already undergone machining operations after welding of the non-compliant vane, and cannot undergo any further machining operations following the welding of the new vane.

There is, therefore, a need to limit or even eliminate the effects of the retraction phenomena observed during welding of the vanes on the shell.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure provide a solution to this need or others which is simple, effective and economical.

The present disclosure thus proposes a method of manufacturing a bladed stator element for a turbomachine, in particular an aircraft, this bladed element having a general annular shape around an axis. In an embodiment, the bladed element comprises:
an annular shell extending around the axis and comprising
an annular fixing flange extending radially outwardly at each of its axial ends, and
an annular row of vanes extending around the axis inside the shell and whose radially outer ends are fixed to the shell.

In an embodiment, the method comprises the steps of welding the radially outer ends of the vanes to the shell, including:
i) prior to welding one or more vane(s) in a circumferential zone of the shell, a step of mounting a tool on this zone of the shell, between the flanges of the shell, this tool being clamped axially against these flanges so as to exert tensile forces in opposite axial directions on these flanges, and
(ii) after the welding of this or these vane(s), a step of dismantling the tool,
steps i) and ii) being repeated on different circumferential zones of the shell so as to fix the vanes all around the shell.

The purpose of the forces exerted on the flanges by the tool is to elastically deform at least one of the flanges and the shell in such a way that the movements thus obtained compensate for the retractions which will be exerted during the welding. The retraction then repositions the flanges and the shell in their original positions and shapes. The tool therefore does not cancel the retraction, but eliminates its effects on the bladed element after welding. Advantageously, the tool is the least bulky possible on the one hand to be easily handled and movable between the circumferential zones of the shell, and on the other hand not to interfere with the welding operation which can be achieved by moving a welding head in the vicinity of or between parts of the tool.

Embodiments of the method according to one or more aspects of the present disclosure may comprise one or more of the following characteristics and/or steps, taken in isolation from one another or in combination with one another:
in each step i), a first plate of the tool is applied against a radial face of one of the flanges, a second plate of the tool is applied against a radial face facing the other of the flanges, and lengths of cylinders for connecting the plates are increased to exert the forces on the flanges,
the first and second plates have a general curved shape and are arranged on the shell so that their concavity is oriented towards the axis,
at least one of the first and second plates comprises pins engaged in holes of the flanges,
the increase of the lengths of the cylinder is achieved by clamping of rigging screws,
each vane comprises a blade connected at its radially outer end to a platform configured to be inserted in a through hole of complementary shape of the shell, between the flanges of this shell, the peripheral edge of the platform being welded to the peripheral edge facing the shell,
the welding is achieved by laser or electron beam.

The present disclosure also relates to a removable tool for carrying out methods of manufacturing a bladed stator element for a turbomachine according to any one of the methods described herein, the bladed element having a general annular shape around an axis. In an embodiment, the bladed element comprises:

an annular shell extending around the axis and comprising an annular fixing flange extending radially outwardly at each of its axial ends, and an annular row of vanes extending around the axis inside the shell and whose radially outer ends are fixed to the shell.

In an embodiment, the tool comprises:

a first plate configured to be applied against a radial face of a first flange of the annular shell and having a general elongated and curved shape with a concavity configured to be oriented towards the axis, a second plate configured to be applied against a radial face of a second flange facing the first flange and having a general elongated and curved shape, with a concavity configured to be oriented towards the axis, cylinders for connecting the plates whose lengths can be varied so that the inter-plate distance can be adjusted, and pins configured to be inserted into holes of the flanges so as to immobilize the tool in the circumferential direction on the shell.

Embodiments of the tool according to one or more aspects of the present disclosure may comprise one or more of the following characteristics, taken in isolation from each other or in combination with each other:

the cylinders are of the rigging screw type, the cylinders are connected by rotatable connections to the plates.

DESCRIPTION OF THE DRAWINGS

The present disclosure will be better understood, and other details, characteristics and advantages will appear more clearly when reading the following description made by way of a non-limitative example and with reference to the attached drawings in which.

DETAILED DESCRIPTION

Figure 1:
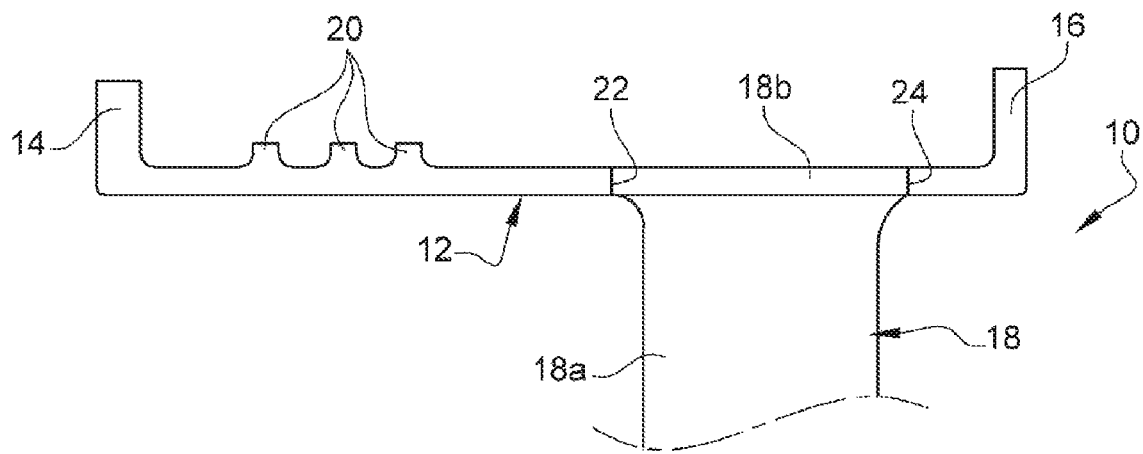
FIG. 1 is a partial schematic half-view in axial cross-section of a bladed stator element of an aircraft turbomachine.
Figure 2:
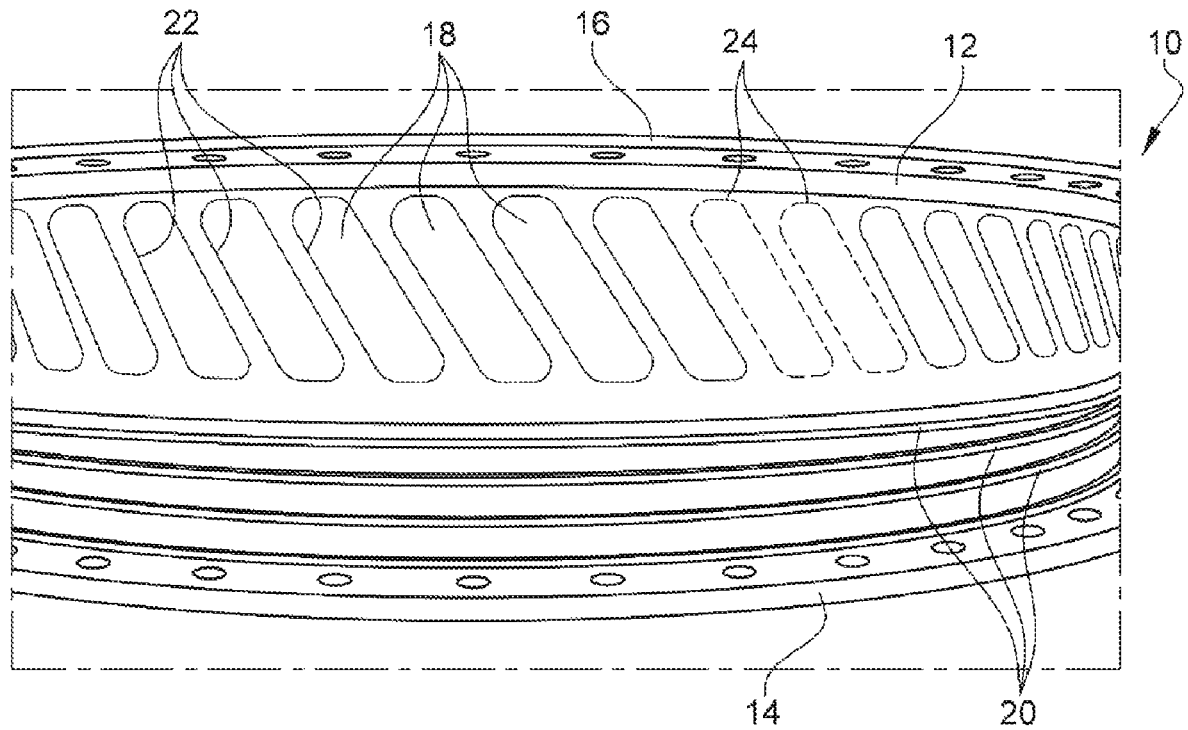
FIG. 2 is a partial schematic side view of the element of FIG. 1.

FIGS. 1 and 2 depict a bladed stator element 10 of an aircraft turbomachine, such as a rectifier of a low-pressure compressor of that turbomachine.

This bladed element 10 comprises an annular shell 12 extending around an axis and having an annular fixing flange 14, 16 extending radially outwardly at each of its axial ends. The bladed element 10 further comprises an annular row of vanes 18 extending around the axis inside the shell 12 and having radially outer ends fixed to the shell 12.

In the example shown, the shell 12 has a general cylindrical shape but may alternatively be truncated. Annular stiffening ribs 20 may be formed protruding from the radially outer cylindrical surface of the shell 12.

The radially outer ends of the vanes 18 are fixed to the shell 12 by welding, e.g., by laser or electron beam. For this purpose, each vane 18 comprises a blade 18a, the radially outer end of which is connected to a platform 18b, which here has a general parallelepipedal shape.

The shell 12 comprises an annular row of through holes 22 and thus opening onto its radially inner and outer cylindrical surfaces. These holes 22 are identical and are shaped and dimensioned to receive the platforms 18b of the vanes 18.

The thickness (or the radial dimension) of the platform 18b is approximately the same as the thickness of the shell 12 at the hole 22. The platform 18b of each vane 18 is engaged in a hole 22 and is separated by a small clearance from the peripheral edge of this hole. This clearance is configured to be filled by a weld bead 24 extending around the entire periphery of the platform 18b. The peripheral edges of the platform 18b and the associated hole 22 are therefore welded together by the weld bead 24. Weld beads 24 are shown schematically as dotted lines in FIG. 2.

Figure 3:
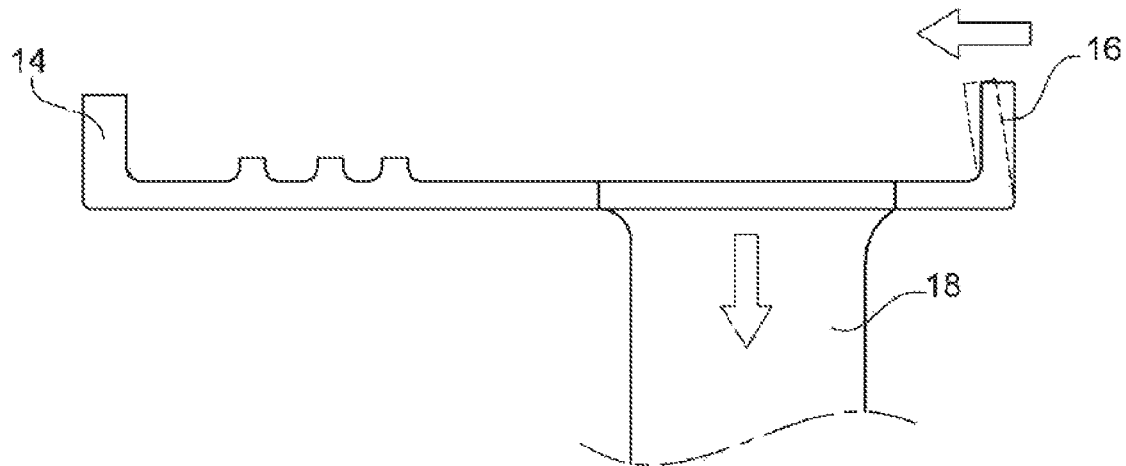
FIG. 3 is a view similar to that of FIG. 1 showing the retraction found in the prior art during a welding operation.

The welding operation generates significant thermal stresses in the element 10 which generate retraction phenomena, schematically represented by the arrows in FIG. 3. The upstream flange 14 on the left on the drawing is oversized and stiffer than the downstream flange 16 or on the right, and the latter then undergoes a retraction (of a few tenths of a millimeter) which is manifested by a deformation of its flange 16 whose outer periphery tends to incline upstream. In addition, the vanes 18 also undergo a retraction (of a few hundredths of a millimeter) which is manifested by a displacement of the vanes radially inwards.

Figure 4:
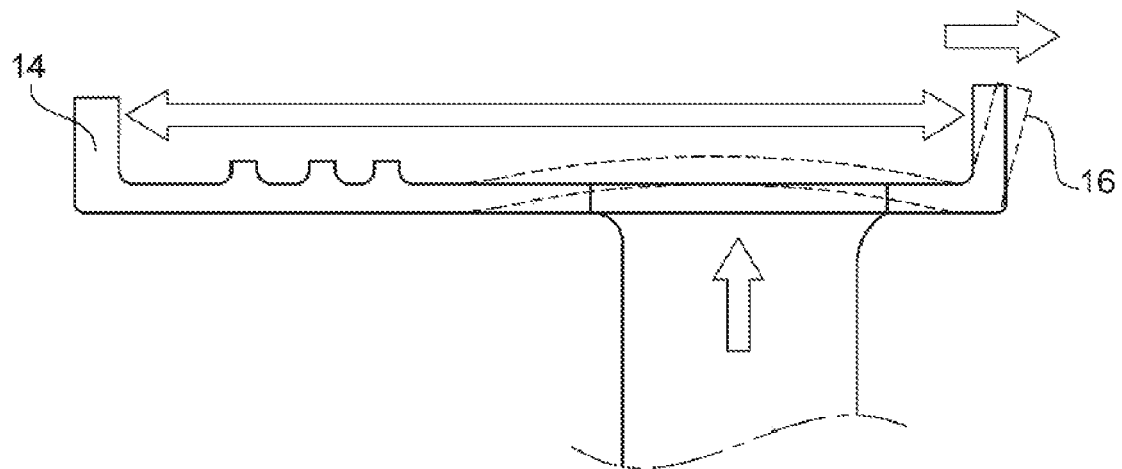
FIG. 4 is a view similar to that of FIG. 1 and showing the elastic deformation applied to the element to compensate for the effects of retraction, in accordance with a method according to one non-limiting embodiment of the present disclosure.

The present disclosure proposes to compensate for the effects of this retraction by exerting tensile forces (double arrow in FIG. 4) on the flanges 14, 16, prior to the welding operation, which are oriented in opposite axial directions. These forces deform the downstream flange 16 generating a slight upward movement of one or more vanes. This elastic deformation allows to compensate at least partially for the retraction related to the weld.

Figure 5:
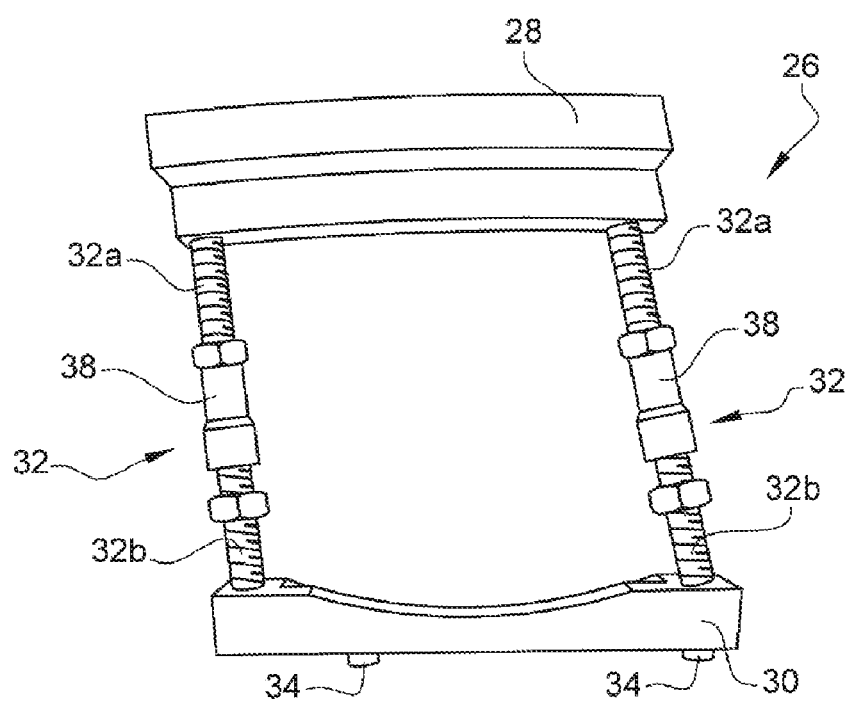
FIG. 5 is a schematic perspective view of a tool for carrying out a method according to one non-limiting embodiment of the present disclosure.

These tensile forces are obtained by means of a tool 26 shown in FIG. 5 and comprising:

a first plate 28 configured to be applied against a radial face of one of the annular fixing flanges, namely on the downstream radial face of the upstream annular fixing flange 14 in the example shown, a second plate 30 configured to be applied against a radial face facing the other one of the annular fixing flanges, namely on the upstream radial face of the downstream annular fixing flange 16 in this example, and cylinders 32 connecting the plates 28, 30 the lengths of which can be modified so as to adjust the inter-plate distance between the first and second plates.

The plates 28, 30 have a general elongated and curved shape and are configured to be arranged on the shell 12 in such a way that their concavity is oriented towards the aforementioned axis.

At least one of the plates 28, 30 comprises pins 34 engaged in holes 36 of the annular fixing flanges, so as to immobilize the tool in the circumferential direction on the shell 12. These holes 36 are advantageously those configured to receive the fixing screws for attaching the bladed element 10 to another stator element of the turbomachine (see FIG. 6).

There are two cylinders 32 in the example shown. One of the cylinders 32 extends between first longitudinal or circumferential ends of the plates 28, 30 and the other of the cylinders extends between second longitudinal or circumferential ends of the plates 28, 30. The plates 28, 30 preferably have identical or similar circumferential extents.

In the example shown, each cylinder 32 is of the type with a rigging screw 38, and comprises a first threaded rod 32a, one end of which is connected to one of the plates, preferably by a rotatable connection, and the opposite end of which is screwed into the rigging screw 38. A second threaded rod 32b has one end screwed into this rigging screw 38 and the other opposite end which is connected to the other one of the plates, preferably also by a rotatable connection. Nuts can be screwed onto the rods 32a, 32b on either side of the rigging screw 38 to hold the rigging screw in a given position when the nuts are clamped.

The screwing of the rigging screw 38 will cause the plates to move closer together and thus reduce the inter-plate distance, and the unscrewing will cause the plates 28, 30 to move further apart and thus lengthen the inter-plate distance.

The aforementioned pins 34 can be formed by the ends of the threaded rods 32a, 32b which pass through the plates and can be inserted in the holes 36 of the flanges 14, 16.

Figure 7:
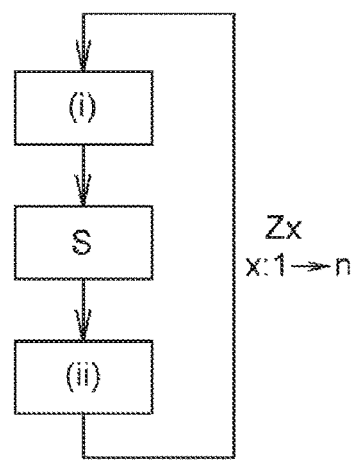
FIG. 7 is a flowchart showing different steps of a representative method according to the present disclosure.

FIG. 7 shows steps of the method of manufacturing according to the present disclosure.

Figure 6:
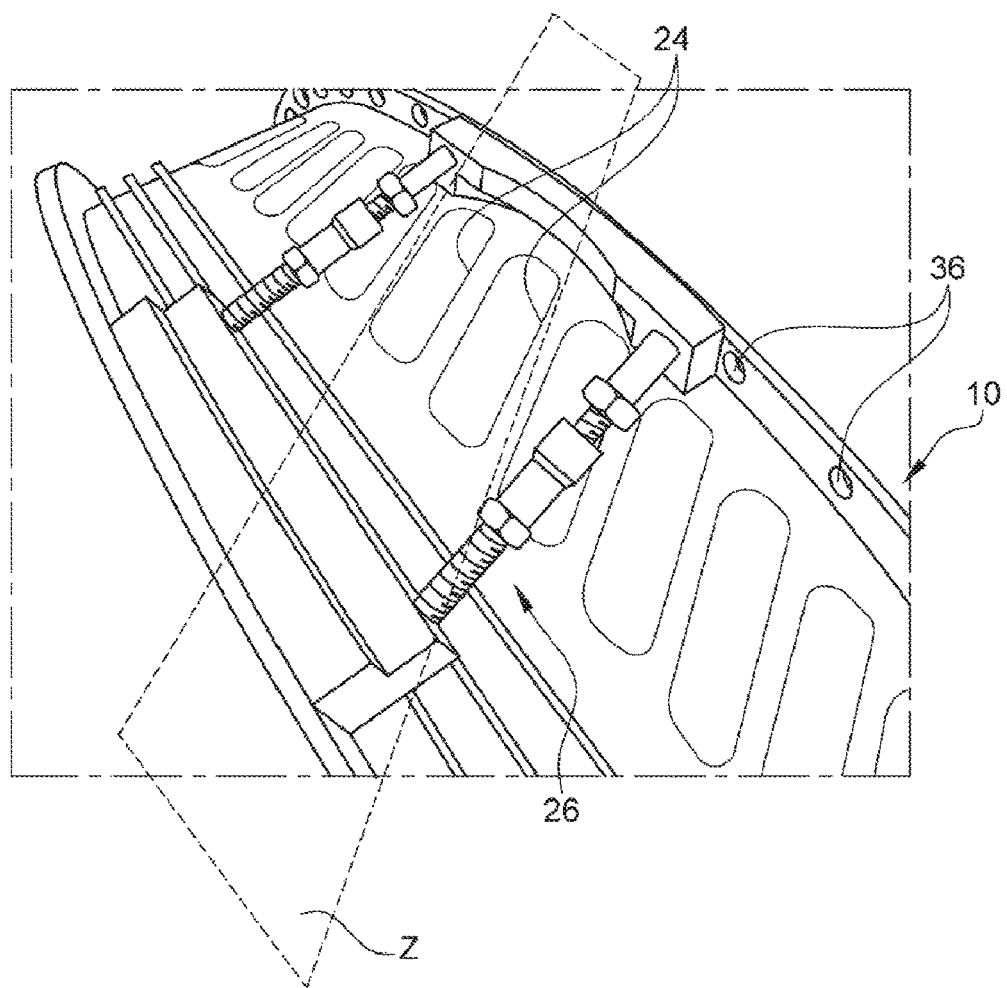
FIG. 6 is a partial schematic side view of the element of FIG. 1, which is equipped with the tool of FIG. 5.

A first step (i) includes mounting the tool 26 on the outer cylindrical surface of the shell 12, between the flanges 14, 16, as shown in FIG. 6. For this purpose, the cylinders 32 are shortened and the tool 26 is mounted in a first circumferential zone Z of the shell 12, e.g., for welding two vanes 18. As shown in FIG. 6, the peripheral clearance to be filled by the weld bead 24 between the platform 18b of the vane and the peripheral edge of the shell 12 is accessible to an operator by means of a welding head which can pass between the two plates 28, 30 on the one hand and between the two cylinders 32 on the other hand. FIG. 6 shows that two vanes are located in the circumferential zone and can be welded through the tool 26. The tool 26 is handled by the operator in such a way as to increase the length of the cylinders 32, to exert the aforementioned forces on the flanges 14, 16 of the shell 12 and to deform the shell, as explained above.

The welding operation (S) of the two vanes 18 located in the circumferential zone Z of the shell 12 can then take place.

After cooling, the tool 26 is disassembled (ii) and steps i, S and ii are repeated several times so that all the vanes 18 are welded all around the shell 12, i.e., on all the circumferential zones (Zx). If the shell comprises 2n vanes and if each circumferential zone Z covers two vanes, the shell comprises n zones and steps i, S and ii are repeated n times.

If necessary, welding can be achieved by protecting the part or at least the weld beads 24, e.g., with an inert atmosphere.

The detailed description set forth above in connection with the appended drawings, where like numerals reference like elements, are intended as a description of various embodiments of the present disclosure and are not intended to represent the only embodiments. Each embodiment described in this disclosure is provided as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed. For example, the present disclosure includes additional embodiments having combinations of any one or more features described above with respect to the representative embodiments.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure.

The present application may include references to directions, such as "first," "second," "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The invention claimed is:

1. A method of manufacturing a bladed stator element for a turbomachine, the bladed stator element having an annular shape around an axis and comprising an annular shell extending around the axis and comprising an annular fixing flange extending radially outwardly at each of its axial ends, and an annular row of vanes extending around the axis inside the annular shell, a radially outer end of each vane being fixed to the annular shell, the method comprising:
   welding the radially outer ends of the vanes to the annular shell;
   i) prior to welding one or more of the vanes in a circumferential zone (Z) of the annular shell, mounting a tool on the circumferential zone of the annular shell, between the annular fixing flanges of the annular shell, the tool being clamped axially against the annular fixing flanges so as to exert tensile forces in opposite axial directions on the annular fixing flanges; and
   (ii) after welding the one or more of the vanes, dismantling the tool,
   wherein the steps i) and ii) are repeated on different circumferential zones (Zi) of the annular shell so as to fix the vanes all around the annular shell.

2. The method according to claim 1, wherein in each step i) a first plate of the tool is applied against a radial face of one of the annular fixing flanges, a second plate of the tool is applied against a radial face facing another of the annular fixing flanges, and lengths of a plurality of cylinders connecting the first and second plates are increased to exert the tensile forces on the flanges.

3. The method according to claim 2, wherein the first and second plates have a curved shape with a concavity, and are arranged on the annular shell so that the concavity is oriented towards the axis.

4. The method according to claim 2, wherein at least one of the first and second plates comprises pins engaged in holes of the flanges.

5. The method according to claim 2, wherein the increase of the lengths of the plurality of cylinders is achieved by clamping a plurality of rigging screws.

6. The method according to claim 1, wherein each vane comprises a blade connected at its radially outer end to a platform configured to be inserted in a through hole of complementary shape of the annular shell, between the annular fixing flanges of the annular shell, a peripheral edge of the platform being welded to a peripheral edge of the annular shell.

7. The method according to claim 1, wherein the welding is achieved by laser or electron beam.

8. A method of manufacturing a bladed stator element for a turbomachine, the bladed stator element having an annular shape around an axis, an annular shell extending around the axis and comprising an annular fixing flange extending radially outwardly at each of its axial ends, and an annular row of vanes extending around the axis inside the annular shell, a radially outer end of each vane being fixed to the annular shell, the method comprising:
  mounting a tool, prior to welding one or more of the vanes in a circumferential zone of the annular shell, on the circumferential zone of the annular shell, between the annular fixing flanges, the tool being clamped axially against the annular fixing flanges so as to exert tensile forces in opposite axial directions on the annular fixing flanges;
  welding the radially outer ends of the one or more vanes to the annular shell in the circumferential zone; and
  dismantling the tool after welding the radially outer ends of the one or more vanes in the circumferential zone,
  wherein mounting the tool and dismantling the tool are repeated on different circumferential zones ($Z_i$) of the annular shell.

* * * * *